Jan. 13, 1942.  E. BICKEL  2,269,900
AERIAL MINE AND PROJECTILE
Filed Oct. 2, 1937  2 Sheets-Sheet 2
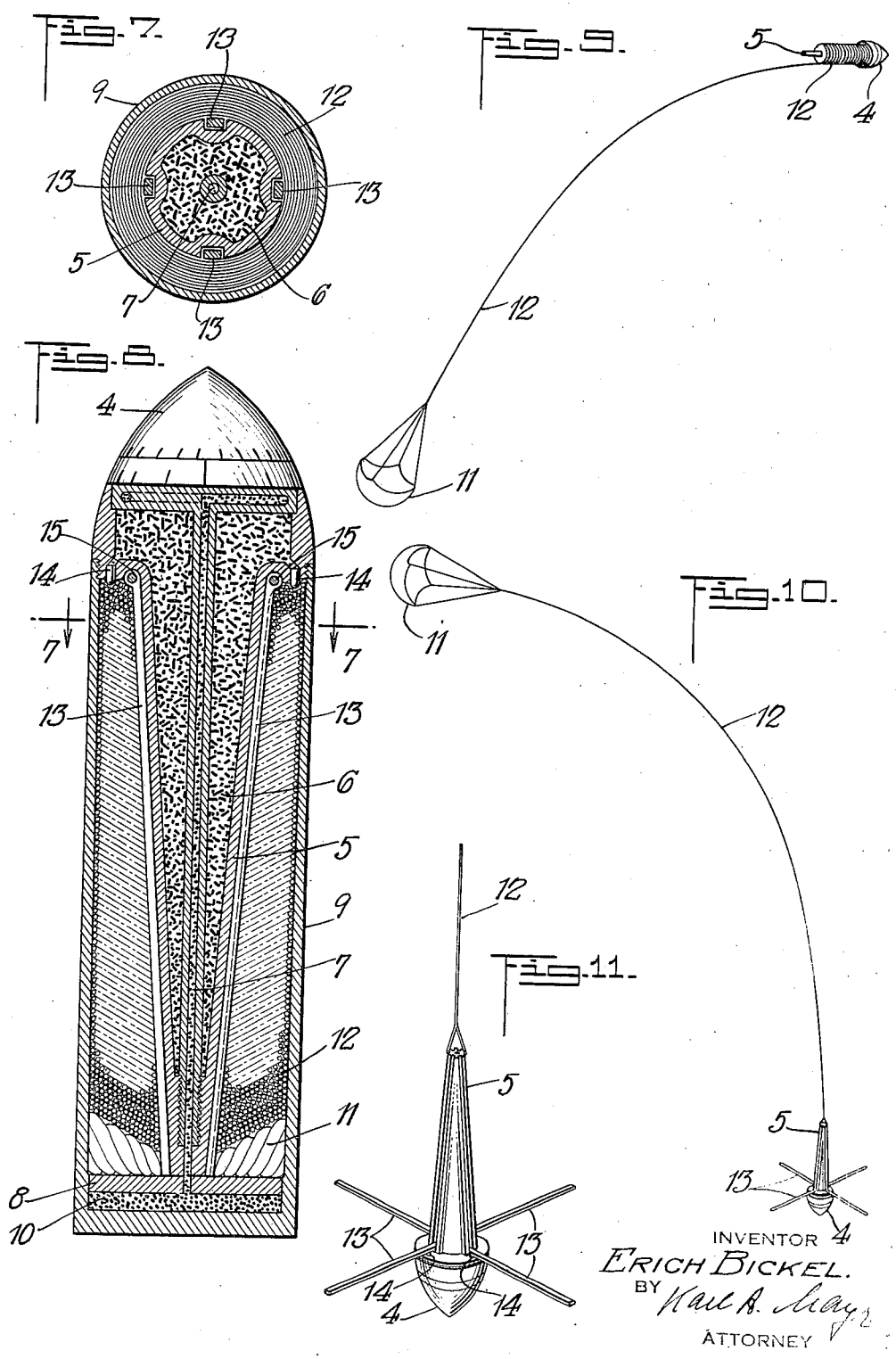
INVENTOR
ERICH BICKEL.
BY
ATTORNEY Patented Jan. 13, 1942

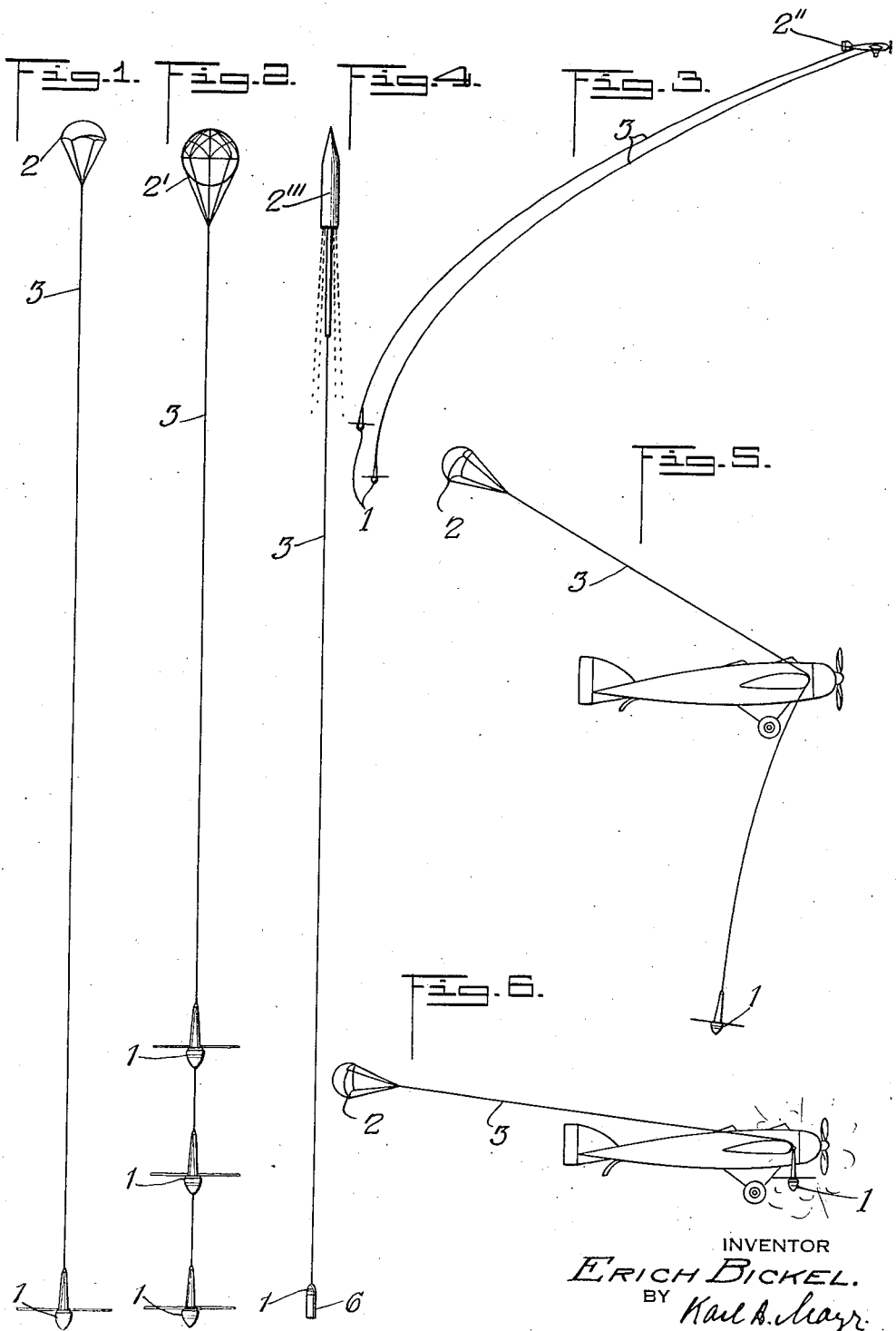

2,269,900

UNITED STATES PATENT OFFICE 2,269,900

AERIAL MINE AND PROJECTILE

Erich Bickel, Zurich, Switzerland

Application October 2, 1937, Serial No. 166,921
In Switzerland March 18, 1937

1 Claim. (Cl. 102—29)

The present invention relates to methods and means for effectively screening a territory against aerial attacks more particularly to improvements in aerial mines and projectiles.

Wire screens, supported, for example, by balloons or other aircraft have been proposed as a defense means against attacks from the air by means of airships, airplanes or other aircraft. Defense means of this type require an extensive ground organization, and the laying out of such screens requires, as a rule, more time than is available during unexpected air attacks. The balloons for supporting the screens form a clearly visible target and can easily be destroyed by the attacking aircraft; they also clearly indicate the upper parts of the screen or wire nets and facilitate flying over the screen into the area supposed to be protected by the screen. In bad weather, particularly in strong winds, the laying out and holding in place of the screens is extremely difficult.

According to the present invention, an effective protection against air attacks is provided by means of a defense means which consists substantially of a plurality of explosive bodies which are individually or jointly supported by means of comparatively long cords, tapes, wires or the like which are kept floating in the air individually or in groups by support means such as parachutes, balloons, motorized aircraft, rockets or other moving bodies and the like.

The operation of the defense means according to the present invention is primarily such that the attacking aircraft is destroyed when hitting one or more of the aforesaid explosive bodies. This effect however will happen comparatively seldom. There is, however, a great probability that the attacking aircraft will collide with one of the supporting wires, ropes or the like.

The explosive bodies according to the present invention are in such circumstances, pulled towards the attacking aircraft by the moving aircraft itself and explode on striking the aircraft thereby effectively destroying it. The action of the defensive means according to the present invention is analogous to that of marine mines, and I therefore term the new apparatus an "air mine."

As will be seen later when I proceed to more specifically describe a practical embodiment of my present invention, the explosive bodies with their support means can be shot in great numbers into the air, and it is easily possible to cover a wide vertical field by the new mines according to my invention in a very short time and thus provide a screen and mine field which is in any case of sufficient size to catch and destroy the attacking aircraft.

It is an object of the present invention to provide means with which, by the use of conventional anti-aircraft guns, anywhere an effective barrier against individual or squadrons of enemy aircraft can be constructed quickly and without a great ground organization and by means of a small number of guns.

According to this invention, the air mine consists of an explosive means which hangs on a rope, wire or the like and is kept floating in the air by means of a parachute, a balloon, an airplane, an airship, a rocket or the like. Contact of the aircraft which is to be destroyed with the rope or wire has this effect: the supporting wire, if at all, moves at a speed which is different from that of the aircraft to be destroyed; the speed of the body which supports the wire and mine is also different from that of the aircraft to be destroyed and remains different also after the aircraft has hit the wire; the moving aircraft therefore bends the rope or wire at the point of contact and at the same time pulls the explosive body towards itself and this at a speed which is substantially equal to the difference between the speed of the aircraft to be destroyed and that of the body which keeps the air mine floating. This pulling action continues until the explosive body hits the aircraft to be destroyed, whereby explosion is brought about, i. e., the mine is primed by known means and the aircraft is effectively put out of action.

The above described pulling action which is due to the said difference of speed will always be possible no matter what kind of means are employed for keeping the air mine floating in the air.

If, for example, the air mine hangs on a parachute, this parachute has an intensive braking or retarding effect whenever the aircraft to be destroyed hits the rope or wire of the air mine, which effect is in proportion to the difference between the speed of the aircraft to be brought down and the speed of movement of the parachute and which difference is always considerable.

It is a further object of the present invention to provide projectiles suitable for laying out air mines, said projectiles being hollow and containing the air mine together with the folded up parachute and, in spooled up condition, a string or wire connecting the parachute and the mine proper.

Further and other objects of the present invention will be hereinafter set forth in the accompanying specification and claims and shown in the drawings which, by way of illustration, show what I now consider to be a preferred embodiment of my invention.

In the drawings:

Fig. 1 shows the air mine proper 1 which hangs from a parachute 2 by means of the rather long wire 3 and freely floats in the air.

Fig. 2 shows an embodiment of the present invention in which a plurality of mines 1 are supported by a balloon 2'.

Fig. 3 shows an embodiment of the present invention in which a plurality of mines are individually supported by a motorized aircraft 2" for example, an unmanned airplane.

Fig. 4 shows an embodiment of the present invention in which the mine 1 is supported by a rocket.

Fig. 5 illustrates the device shown in Fig. 1 at the moment when an airplane has hit and bent the supporting wire and now pulls the parachute, which, due to its retarding action, pulls the mine proper 1 towards the airplane.

Fig. 6 illustrates the moment when, due to the movement of the airplane and the retarding action of the parachute, the mine proper is completely pulled up to the airplane and ignited.

Fig. 7 is a cross sectional view of a projectile according to the present invention taken along line 7—7 of Fig. 8.

Fig. 8 is a longitudinal sectional view of the projectile and air mine according to the present invention.

Fig. 9 diagrammatically illustrates the unwinding operation of the wire connecting the parachute and mine proper of the air mine according to the present invention.

Fig. 10 illustrates the swinging out and the final phase of the laying out of the mine.

Fig. 11 shows the mine proper ready for action and the provisions for activating the impact.

If a controllable craft is used for keeping the mine in the air, the pilot or operator can always arrange an effective difference of speed or direction of movement between the supporting craft and the aircraft to be destroyed.

As is shown in Fig. 2, a plurality of individual explosive bodies may be supported by the same rope or wire, and these may be individually connected to the rope or wire at suitable intervals.

I proceed now to a more detailed description of Figs. 7 to 11.

Like parts are designated by like numerals in said figures of the drawings.

4 represents a heavy member forming the head of the projectile which contains a time fuze of any known construction. Head 4 is also the head of the air mine proper and contains an impact fuze of any known construction. The main body of the mine proper is designated by numeral 5 and is filled with a destructive charge such as a bursting or explosive charge and, if desired, with an incendiary charge 6. Body 5 is provided with a bore or ignition channel 7 which contains means known in the art for transmitting the effect of the time fuze located in head 4 to the lower parts of the projectile. 8 is a disconnectable disk or separating member. 9 represents the shell and bottom of the projectile, which parts are disconnectably joined to head 4. 10 is a customary adjustable power and projecting means such as gun powder, compressed air, gas, mechanical means and the like. 11 represents the folded up parachute which is connected with the mine body 5 by means of the spooled up wire 12.

The laying out of the mine is effected as follows: The projectile is shot to the point at which the parachute should be located later on. By means of the time fuze and the ignition channel, the charge 10 at the bottom of the projectile is brought into operation, whereby the shell 9 and bottom of the projectile are thrown off backwards. Thereby also the loose disk 8 is ejected and parachute 11 is unfolded. The mine proper, because of the heavy member 4, continues its forwards movement, whereby the connecting wire, the movement of which is retarded at one end by the parachute, runs off its spool much in the same manner as, for example, the weft thread runs off the shuttle in looms for weaving. The running off of the wire is preferably retarded, for example, by sticking together the individual layers or threads of the wire spool by means of suitable glue, solder or the like. Fig. 9 shows the unwinding operation of wire 12.

After exhaustion of the kinetic energy, the mine proper swings downwards along a gradually straightening parabolic path about the relatively stationary parachute until it swings like a pendulum substantially vertically below the parachute. This phase of operation is illustrated in Fig. 10.

In order to prevent explosion of the mine when it reaches the ground, the fuze in the head of the mine is so constructed that it is actuated only by impact which acts in the direction from the parachute towards the mine and not by impact acting in the opposite direction. Since the mine is caught and pulled by the aircraft to be destroyed by this aircraft itself, as is shown in Figs. 5 and 6, the mine need act and explode and or ignite only when hit in the direction extending from the parachute towards the mine and not in the opposite direction. When the mine drops down to the ground, which occurs at a speed which is much slower than the speed at which it is pulled towards the aircraft to be destroyed, the impact is weak and acts against the head 4 of the mine which hangs downward, i. e., the impact occurs in a direction towards and not from the parachute, and no explosion is effected.

The means for bringing about the desired one directional ignition effect set forth in the paragraph next above are diagrammatically shown in Figs. 7 and 8, 11. To the mine proper, a plurality of rods or arms 13 are hinged which are held to its body 5 by means of the wire 15 and swing downward into the position shown in Fig. 11 when the head of the mine reaches a position below the parachute and when the wire 12 has unwound completely. When rods or arms 13 have reached the position shown in Fig. 11 they abut against auxiliary ignition charges 14, and when hit from above, for example, by the body of the craft to be destroyed, ignite the charges 14. When hit from below, they have no ignition effect.

The fuze can also easily be so constructed that the mine is completely dead when contacting with the ground.

The release of the means for removing the shell 9 can, for example, also be effected by means of a clockwork instead of by a time fuze.

Other modifications of the construction may be made by those skilled in the art without departing from the scope of the invention disclosed in the present specification.

I claim:

A projectile for an aerial mine including a mine, a gravity opposing support means folded around said mine, a long flexible suspension means interconnecting said mine and said support means and being closely wound in a plurality of concentric layers around and directly adjacent to said mine and forming a coil abutting said folded support means and having an inner end connected with said mine and an outer end connected with said support means, a projectile dismantling charge disposed at the rear end of said projectile, and a fuse located, with respect to the direction of flight of said projectile, forward and extending through the center of said mine into said dismantling charge.

ERICH BICKEL.